United States Patent Office 3,306,778
Patented Feb. 28, 1967

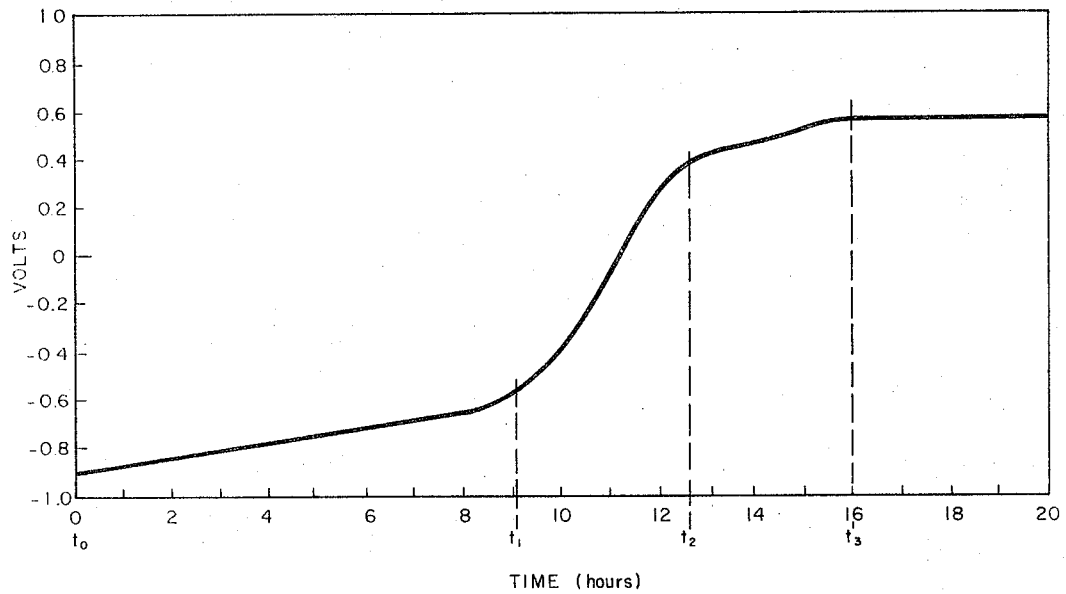

3,306,778
SECONDARY BATTERY ELECTRODE AND METHODS OF MAKING
Edwin R. Bowerman, Flushing, and Irving Sheinhartz, Bayside, N.Y., assignors to General Telephone and Electronics Laboratories, Inc., a corporation of Delaware
Filed Dec. 21, 1964, Ser. No. 419,772
10 Claims. (Cl. 136—120)

This invention relates to positive electrodes for secondary alkaline batteries and to methods of making such electrodes.

In a conventional secondary alkaline battery of the nickel-cadmium type, the positive electrode usually consists of a porous nickel plaque or core impregnated with active nickel hydroxide. While this electrode construction is adequate for many purposes, it has been found that the porous nickel plaque is not only quite fragile but has a relatively low electrical conductivity causing the electrode performance at high charging and drain rates to be less than satisfactory. Further, the present methods of making such electrodes are somewhat complex and expensive and, unless carefully controlled, may result in warped electrodes.

Accordingly, it is an object of our invention to provide an improved positive electrode for alkaline batteries which employs a core having relatively high electrical conductivity and good mechanical properties.

Another object is to provide a positive electrode which may be fabricated by a simpler, more efficient and less expensive process than that used in the conventional impregnation of porous nickel plaques.

Still another object is to provide an electrode having a fully dense nickel core rather than the relatively mechanically weak porous sheet heretofore employed.

In the present invention, a positive electrode (hereinafter termed a coated electrode) is provided which comprises a metallic substrate or core having a layer of electrochemically active hydrated nickel oxide secured thereto. Preferably, the metallic core is formed of fully dense nickel in order to obtain maximum conductivity and mechanical strength. However, a nickel alloy sheet having additions of chromium, cobalt, lithium, titanium or similar metals may also be used as the electrode core.

The coated electrode is formed by bringing aluminum into contact with the surface of the nickel-containing core at an elevated temperature thereby interdiffusing the aluminum and nickel to form a layer of nickel aluminide ($Ni_2Al_3$) metallurgically bonded to the substrate. By metallurgically bonded it is meant that in the interface the distance between the atoms of the substrate and the coating is on the order of an atomic diameter. After the nickel aluminide layer has been formed to the desired thickness on the core, the structure is placed in a caustic solution to dissolve out the diffused aluminum. The dissolution step produces a layer of active nickel containing hydrogen and some residual aluminum. As disclosed in copending U.S. patent application Serial No. 419,935, filed December 21, 1964 by Irving Sheinhartz, Clayton D. Dickinson and Jerome J. Perez, an electrode structure results which can be used as a negative electrode in either a primary or secondary alkaline cell.

In order to form a positive coated electrode, the active nickel on the negative electrode it then anodically converted in a caustic solution to an electrochemically active hydrated nickel oxide.

Chemical analysis of the oxide coating formed on the nickel core shows that it consists primarily of electrochemically active hydrated nickel oxide containing between 0.5 and 5 percent aluminum uniformly distributed throughout the nickel oxide. Infrared analysis of the charged electrode over the frequency (wave number) range 400 cm.$^{-1}$ to 6000 cm.$^{-1}$ shows a broad and intense band having a peak at 3432 cm.$^{-1}$, a weak line at 1620 cm.$^{-1}$, a sharp and very intense peak at 1095 cm.$^{-1}$ and weak lines at 1170 and 2925 cm.$^{-1}$. The 3432 cm.$^{-1}$ peak corresponds to the stretching frequency of hydrogen bonded lattice water and the 1620 cm.$^{-1}$ line to the lattice water H—O—H binding frequency. The bands having peaks at 1170 and 2925 cm.$^{-1}$ are believed particularly significant in defining the material.

The above objects of and the brief introduction to the present invention will be more fully understood and further objects and advantages will become apparent from a study of the following description in connection with the drawing, wherein the figure shows a time-potential curve indicating the change in electrode voltage as the electrode is charged.

A 100 percent dense nickel sheet having a thickness of about 0.010 inch was selected for use as the electrode substrate. Although a fully dense nickel core is preferred since it provides greatest electrical conductivity and mechanical strength, the core may have some porosity and still be acceptable. The thickness of the core is not critical and depends upon the conductivity of the core material and the desired capacity of the electrode. In general, the capacity of the electrode increases with the thickness of the coating and therefore to obtain an electrode having maximum volume, the thinnest core consistent with good mechanical strength and current capacity should be used.

The nickel sheet was placed in a pack consisting of a mixture of approximately 58 percent aluminum oxide ($Al_2O_3$), 40 percent aluminum powder and 2 percent ammonium chloride ($NH_4Cl$). The composition of the mixture is not critical and wide variations are permissible. Other halides such as ammonium fluoride ($NH_4F$) and sodium fluoride ($NaF$) may also be used in place of ammonium chloride. The nickel substrate and surrounding mixture were heated in a reducing atmosphere for 8 hours at 800° C. and then cooled to room temperature. The resulting structure consisted of a nickel core covered on both sides by an approximately 0.008 inch layer of nickel aluminide ($Ni_2Al_3$). (In addition, trace amounts of $NiAl_3$ are sometimes formed on the surface of the $Ni_2Al_3$.) A reducing atmosphere composed of hydrogen was used in producing the nickel aluminide coating although an inert atmosphere such as argon may also be employed.

The thickness of the coating is determined by the duration and temperature of the diffusion process, temperatures in the range 625°–900° C. giving satisfactory results. Specific examples showing the relationship between time, temperature and coating thickness are given in Table I.

TABLE I

| Duration (Hours) | Temperature (° C.) | Coating Thickness (Inch) |
|---|---|---|
| 8 | 850 | 0.008 |
| 16 | 850 | 0.012 |
| 16 | 750 | 0.008 |

The coated nickel core was next immersed in a solution containing a 6 normal sodium hydroxide solution at a temperature of 80° C. for about 16 hours. At the end of this period at least 85 percent of the aluminum was dissolved out of the structure forming a negative electrode as disclosed in the aforementioned patent application Serial No. 419,935. The reaction of the aluminum with the sodium hydroxide solution produced hydrogen which was combined with the nickel coating to form an active surface. It has been found that the dissolution step may be carried out at temperatures in the range 20°–100° C. for periods of from 1 to 32 hours and that potassium hydroxide may be used in place of sodium hydroxide.

The negative electrode was converted to a positive coated electrode by charging it in an alkaline electrolyte (such as sodium or potassium hydroxide) with a counterelectrode made for example of nickel sheet. A direct current was passed between the electrode being charged (termed the working electrode) and the counterelectrode, the working electrode being held positive with respect to the counterelectrode. The charging current was maintained between the working electrode and the counterelectrode until oxygen had formed at the coated electrode and the voltage had stabilized indicating that the working electrode was positive and fully charged. The time required for initial charging varies with coating thickness and is approximately 800 milliampere hours per square inch for a double 0.008 inch coating.

It is found that the potential of the working electrode with respect to a mercury-mercury oxide reference electrode at the start of the charging period is about −0.9 volt. This negative voltage is held for approximately 400 milliampere hours per square inch (for a 0.008 inch coating) as the charging proceeds and then becomes positive, the voltage between the fully charged coated positive electrode and the reference electrode being about +0.6 volt.

The change in voltage with time as the electrode is initially charged at a 50 milliampere rate is illustrated in the figure. As shown, the voltage between the electrode being charged and the reference electrode increased only slightly for the first 9 hours, increased rapidly during the interval ($t_2 - t_1$) and finally became constant after 16 hours of charging ($t_3$).

An infrared absorption analysis was made of discharged and charged coated electrodes in order to further identify the coating material. The infrared data was obtained from samples which were washed free of potassium hydroxide, dried for prolonged periods at 60° C. and ground to a fine powder (325 mesh). The powder was then made into a pellet with 99.5 percent potassium bromide.

The spectra shown in Table II were obtained using a Perkin-Elmer recording infrared spectrometer. For purposes of comparison, data is also presented on the spectra of charged and discharged conventional porous nickel electrodes impregnated with nickel hydroxide [$Ni(OH)_2$].

As indicated in Table II, the conventional $Ni(OH)_2$ impregnated porous nickel electrode has a strong, intense band at 3650 cm.$^{-1}$ in its discharged state. This band corresponds to the stretching frequency of the hydroxyl group. In contrast, this band is absent from the spectra of the electrode of our invention in both its charged and discharged states.

The coated electrodes described are extremely flexible and can literally be twisted into almost any configuration without damage. Batteries can therefore be designed to utilize electrodes of more complex and efficient shape than has heretofore been possible. For example, electrodes 0.02 inch thick were bent double with a zero bend radius without damage to their mechanical or electrochemical integrity. Further, the reversible positive capacity of these electrodes on a volume basis is greater than that of conventional impregnated electrodes. In addition, the high electrical conductivity of the solid nickel core makes possible charging and discharging rates much higher than those obtained with conventional impregnated electrodes.

An electrode was prepared by the method just described except that the pack method was not used for forming the nickel aluminide. In lieu thereof, the nickel sheet was rolled between two aluminum sheets to form a metallic bond. The nickel sheet and bonded aluminum were then heated in a reducing (or inert) atmosphere at a temperature of 1100° F. to form $Ni_2Al_3$. Preferably, temperatures below 1200° F. are used in this method although temperatures as high as 1600° F. may be used.

Summarizing, our invention provides a positive electrode having a fully dense nickel core covered on both sides by an electrochemically active non-porous hydrated nickel oxide coating. Since the core can be 100 percent dense, it permits a thicker coating of active material within the same volume without sacrificing mechanical strength or electrical conductivity. Further, the electrode can be manufactured by a relatively simple process comprising the formation of nickel aluminide on a dense nickel core, dissolving out the aluminum and charging the electrode.

As many changes could be made in the above described processes and many different embodiments could be made without departure from the scope thereof, it is intended that all matter contained therein shall be interpreted as illustrative and not in a limiting sense.

What is claimed is:

1. A flexible positive electrode comprising a non-

TABLE II

| Sample | Wave Numbers in cm.$^{-1}$ | | | | |
| --- | --- | --- | --- | --- | --- |
| | Hydroxyl Stretch | Lattice Water, —OH Stretch | Lattice Water, H—O—H Bend | Ni—O Bend | Other Bends |
| Discharged $Ni(OH)_2$ (impregnated electrode). | 3,650 s, i (3,680 to 3,600). | 3,435 b, d (3,580 to 3,100). | 1,620 w (1,680 to 1,570). | 1,100 w (1,140 to 1,050). | |
| Charged $Ni(OH)_2$ (impregnated electrode). | | 3,432 b, vi (3,650 to 3,050). | 1,620 w (1,650 to 1,570). | 1,105 w (1,120 to 1,070). | |
| This invention (electrode discharged). | | 3,432 b, vi (3,650 to 3,150). | 1,620 w (1,750 to 1,570). | 1,105 s, vi (1,150 to 1,060). | 2,925 vw (2,950 to 2,900), 1,180 w (1,210 to 1,150). |
| This invention (electrode charged). | | 3,432 b, i (3,650 to 3,150). | 1,620 w (1,750 to 1,520). | 1,095 s (1,104 to 1,060). | 2,925 vw (2,950 to 2,900), 1,170 w (1,190 to 1,140). |

In the above table, the frequencies given are in the center of the band and the bandwidths are given in parenthesis. The letter symbols describe the amplitude of the bands and have the following meaning:

s—sharp
b—broad
d—diffuse
i—intense
vi—very intense
w—weak
vw—very weak porous substrate consisting essentially of nickel having a layer consisting essentially of electrochemically active hydrated non-porous nickel oxide containing between 0.5 and 5.0 percent aluminum secured thereto, said layer being characterized by a response to infrared radiation indicating spectral absorption peaks at wave numbers of 2925 and 1170 cm.$^{-1}$.

2. A flexible positive electrode comprising a non-porous substrate consisting essentially of nickel having a layer consisting essentially of electrochemically active hydrated non-porous nickel oxide containing between 0.5 and 5.0 percent aluminum secured thereto, said layer being characterized by a response to infrared radiation indicating spectral absorption peaks at wave numbers of 3432, 1620, 1095, 2925 and 1170 cm.$^{-1}$.

3. A method of making a positive electrode comprising the steps of
   (a) forming a coating of an aluminide on a metallic substrate,
   (b) dissolving the aluminum from said coating, and
   (c) anodically charging said electrode.

4. A method of making a flexible positive electrode comprising the steps of
   (a) forming a coating of nickel aluminide on a non-porous nickel substrate,
   (b) dissolving the aluminum from said coating, and
   (c) anodically charging said electrode.

5. A method of making a flexible positive electrode comprising the steps of
   (a) bringing aluminum into contact with the surface of a nickel containing substrate at a temperature in the range 625 to 900° C. to form a nickel aluminide coating,
   (b) dissolving the aluminum out of said nickel aluminide coating to form a negative electrode, and
   (c) anodically charging said negative electrode to form a positive electrode, said positive electrode comprising a nickel containing substrate having a layer consisting essentially of electrochemically active hydrated nickel hydroxide secured thereto.

6. A method of making a flexible positive electrode comprising the steps of
   (a) placing a nickel containing substrate in a mixture of aluminum oxide, aluminum powder and a halide and heating said substrate and mixture in a reducing atmosphere to a temperature in the range 625 to 900° C. to form a nickel aluminide coating on said substrate,
   (b) placing said nickel aluminide coated substrate in a caustic solution to dissolve out the aluminum, and
   (c) anodically charging said negative electrode to form a positive electrode, said positive electrode comprising a nickel containing substrate having a layer consisting of electrochemically active hydrated nickel hydroxide secured thereto.

7. A method of making a flexible positive electrode comprising the steps of
   (a) placing a fully dense nickel substrate in a mixture consisting of approximately 58 percent aluminum oxide, 40 percent aluminum powder and 2 percent of a halide,
   (b) heating said substrate and mixture in a reducing atmosphere to a temperature in the range 625 to 900° C. to form a nickel aluminide coating on said substrate,
   (c) placing said nickel aluminide coated substrate in a caustic solution at a temperature of about 80° C. until essentially all of the aluminum is dissolved out thereby forming a negative electrode and
   (d) anodically charging said negative electrode in an alkaline electrolyte to form a positive electrode, said positive electrode comprising a nickel containing substrate having a layer consisting essentially of electrochemically active hydrated nickel hydroxide secured thereto.

8. The method of making a flexible positive electrode disclosed in claim 7 wherein the nickel aluminide coating is formed on the nickel substrate by heating to about 800° C. for approximately 8 hours in a hydrogen atmosphere.

9. The method of making a flexible positive electrode disclosed in claim 7 wherein the halide is selected from the group consisting of ammonium chloride, ammonium fluoride and sodium fluoride.

10. A method of making a flexible positive electrode comprising the steps of
    (a) rolling a nickel containing sheet between two aluminum sheets to form a metallic bond therebetween,
    (b) heating said bonded nickel containing sheet and aluminum to a temperature of approximately 1100° C. in a reducing atmosphere to form a nickel aluminide coating on said substrate,
    (c) dissolving the aluminum out of said nickel aluminide coating to form a negative electrode, and
    (d) anodically charging said negative electrode to form a positive electrode, said positive electrode comprising a nickel containing substrate having a layer consisting essentially of electrochemically active hydrated nickel hydroxide secured thereto.

References Cited by the Examiner

UNITED STATES PATENTS

| | | | |
|---|---|---|---|
| 1,377,194 | 5/1921 | Edison | 136—28 |
| 2,928,891 | 3/1960 | Justi et al. | 136—120 |
| 3,202,544 | 8/1965 | Vielstich | 136—28 |
| 3,203,879 | 8/1965 | Mueller | 136—29 |

WINSTON A. DOUGLAS, *Primary Examiner.*

A. SKAPARS, *Assistant Examiner.*